April 11, 1961   C. E. KETCHUM   2,979,129
WINDSHIELD COVER
Filed March 28, 1958

Calvin E. Ketchum
INVENTOR.

BY Clarence A. O'Brien
and Harvey B. Jacobson
Attorneys

# United States Patent Office 2,979,129
Patented Apr. 11, 1961

2,979,129
WINDSHIELD COVER

Calvin E. Ketchum, 2205 Cleveland St., Klamath Falls, Oreg.

Filed Mar. 28, 1958, Ser. No. 724,759

1 Claim. (Cl. 160—368)

The present invention relates to a readily applicable and removable cover for the exterior of an automobile windshield and the purpose of which is to substantially, if not entirely, prevent the depositing of snow, sleet, frost, rain and even dirt and dust, on the windshield overnight, or at such times that the automobile is parked at one's home or elsewhere.

As the preceding general statement of the nature of the invention clearly reveals so-called snow and frost covers for automobile winshields are old and well-known. Therefore, it can be said that in this line of endeavor it is a common practice to utilize a flexible cloth, fabric or an equivalent cover and to construct and design the same so that it will extend over the desired portions or areas of the windshield. Various devices and adaptations have been resorted to in styling the cover in one manner or another for fitting usage. Likewise, many and varied forms and types of fasteners have been appropriated with a view toward aptly and satisfactorily attaching the cover to the automobile, usually accessible parts at the transverse or vertical ends of the windshield.

It will be evident that the instant concept has to do with a cover, preferably constructed from lightweight and suitable canvas, which is marginally shaped and designed to bring about improved and more effectual results. Stated otherwise, the invention is an improvement upon prior analogous patents and an underlying idea is to provide a construction which will comply with manufacturing requirements and economies of manufacture, is such that it can be unqualifiedly endorsed by retailers, and will meet with the needs of the average user once he has had an opportunity to give it a fair and reliable trial.

More specifically, in carrying out the invention the pattern adopted is one wherein the major or body portion of the cover varies to lend itself to ready use with windshields of varying shapes and sizes. The end portions are fashioned into narrowed flaps and the flaps have terminal spring-anchored simple hook-shaped clips. The clips are designed and adapted to releasably engage over the trailing edges of the usual hinged ventilators mounted in the front doors of an automobile. In order to insure a more reliable and acceptable fit the longitudinal edge portions are provided with hems carrying drawstrings which can be tied and which serve to tauten the cover sufficiently to take up slack and render it more efficient.

Other objects, features and advantages will become more readily apparent from the following description and the accompanying drawing.

In the drawing, wherein like numerals are employed to designate like parts throughout the views.

Figure 1:
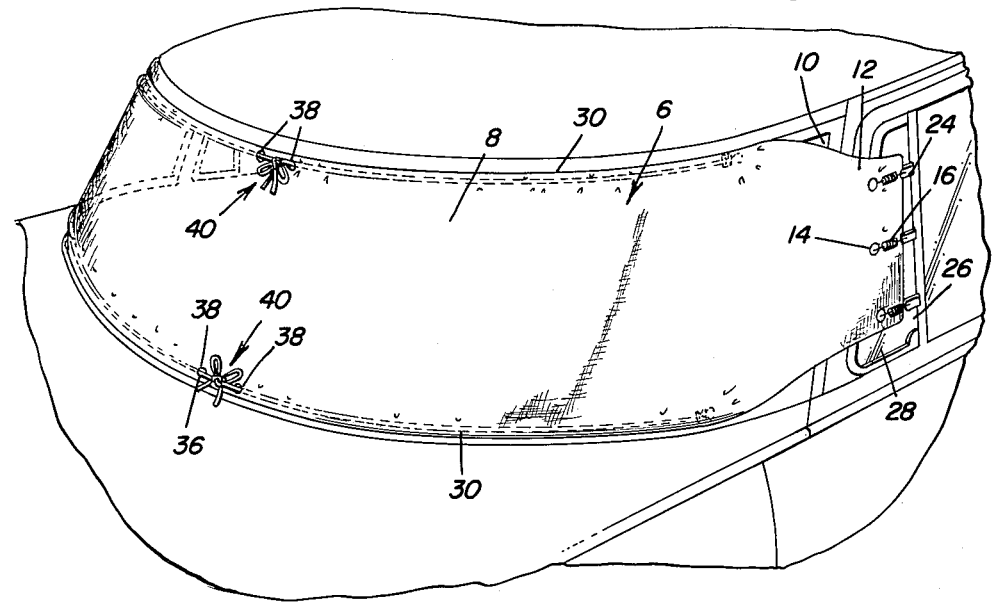
Fig. 1 is a fragmentary perspective view showing an automobile windshield and employing the improved cover and showing how it is constructed and attached.
Figure 2:
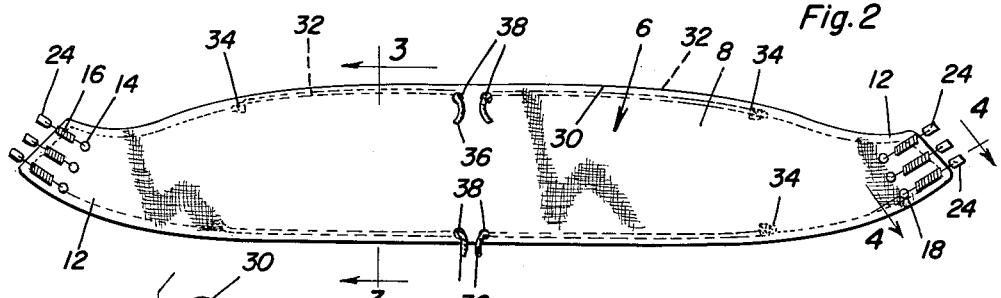
Fig. 2 is a plan view of the cover by itself.
Figure 3:
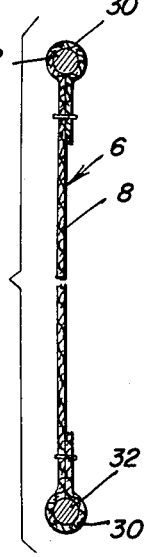
Fig. 3 is an exaggerated cross-section on the line 3—3 of Fig. 2 looking in the direction of the arrows.
Figure 4:
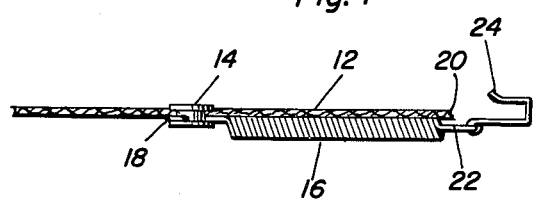
Fig. 4 is an equally exaggerated detail section taken on the plane of the line 4—4 of Fig. 2 looking in the direction of the arrows.

With reference now to the drawing and particularly to Figs. 1 and 2, the cover as an entity is denoted by the numeral 6 and as before stated it is characterized by a lightweight canvas or an equivalent durable water-repellant material. It should be sufficiently flexible that it can be easily rolled into compact form when not in use and conveniently put away, for example, within the confines of the automobile itself. The body portion 8 is of generally elongated or rectangular form and the shaping thereof will vary so that it may be said to be of a shape or pattern that lends itself to shielding coverage of the surface of the automobile windshield. The terminal or end portions are gradually reduced to define relatively narrow and aptly shaped attaching and retaining flaps 12. Each flap is provided with a series of eyelets or equivalent elements 14 and a coil spring 16 is provided with each eyelet. The coil spring 16 has a hook 18 at one end (Fig. 4) engaged with the eyelet. Each coil spring itself is superimposed upon and reaches rearwardly toward the trailing edge 20 of the flap where it has a hook 22 to which a hook-shaped anchoring clip 24 is hingedly connected. Using several eyelets, several coil springs and a corresponding number of hook-clips it will be seen that the construction is suitable for attachment to the rear or trailing edge portion 26 of a more or less conventional ventilator 28. Both ends of the cover are the same. The upper and lower edge portions are provided with lengthwise hems 30 and each hem is adapted to accommodate complemental portions of cooperating drawstrings. That is to say, the drawstrings are arranged in pairs in each hem and are denoted by the numeral 32. The outer end of each drawstring is suitably knotted and anchored against movement at 34. The other free end 36 passes through one of the holes or openings 38 provided therefor at the central or median portion of the cover.

As a general proposition it is contemplated that in practice there shall be two or more models, a large size for the newer cars and a small size for the older cars and smaller foreign cars. The cover is held on the windshield by way of the spring attached clips. That is to say, the clips are clipped over the ventilators in the manner shown. Then the ventilators are closed and the cover will stay in place until manually detached. The drawstrings will take out the slack for smaller and different shaped windshields. Once the strings are tied as at 40 (Fig. 1) and suitably adjusted to a particular make of windshield it is no longer necessary to make subsequent adjustments.

It is evident that the windshield cover will keep one's windshield clear on frosty and snowy nights. It is a highly advantageoeus accessory for the car owner without a garage and who ordinarily must leave his car parked in a driveway or on a street. The user of this invention will appreciate its usefulness when he gets in his car to drive off and finds that he has a clear windshield while his neighbor's car is covered with snow or frost which has to be scraped off before he attempts to get underway. Manifestly, an accessory such as this will save time and and bother and help to conserve one's temper and disposition when venturing out early on a snowy or similar day.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A vehicle windshield protector comprising, in combination, a horizontally elongated, flexible cover for application to the windshield, said cover including longitudinal marginal upper and lower hems, an intermediate portion of said cover having upper and lower pairs of holes therein communicating with said hems, coil springs on outer end portions of the cover, clips on the coil springs engageable with the adjacent side portions of the vehicle beyond the front windshield thereof for securing the cover in position and, in conjunction with said coil springs holding the cover taut, and separate upper and lower pairs of drawstrings in the upper and lower hems respectively having outer ends anchored in the end portions thereof, the other ends of said pairs of drawstrings being free and passing slidably through the holes for drawing together the upper and lower hems by different amounts causing the cover to conform to different configurations of different windshields.

References Cited in the file of this patent

UNITED STATES PATENTS

| | | |
|---|---|---|
| 747,809 | Velasko | Dec. 22, 1903 |
| 2,437,845 | Wyeth | Mar. 16, 1948 |
| 2,614,630 | Moszelt | Oct. 21, 1952 |
| 2,660,730 | Nordling | Dec. 1, 1953 |
| 2,666,840 | Poirier | Jan. 19, 1954 |
| 2,717,036 | Harris | Sept. 6, 1955 |
| 2,821,248 | Irvine | Jan. 28, 1958 |
| 2,823,746 | Morgan | Feb. 18, 1958 |